United States Patent [19]

Glabe et al.

[11] 4,455,321
[45] Jun. 19, 1984

[54] POTATO SNACKS AND METHOD OF PREPARATION

[75] Inventors: Elmer F. Glabe, Northbrook; Perry W. Anderson, Niles; Stergios Laftsidis, Chicago, all of Ill.

[73] Assignee: Food Technology Products, Chicago, Ill.

[21] Appl. No.: 522,000

[22] Filed: Aug. 11, 1983

Related U.S. Application Data

[63] Continuation-in-part of Ser. No. 376,421, May 10, 1982, abandoned.

[51] Int. Cl.³ ............... A21D 2/02; A21D 2/08; A23L 1/216
[52] U.S. Cl. ............... 426/549; 426/446; 426/550; 426/551; 426/555; 426/559; 426/637; 426/808
[58] Field of Search ............ 426/104, 550, 551, 555, 426/559, 637, 653, 512, 446, 514, 523, 808, 549, 622, 625, 662, 804

[56] References Cited

U.S. PATENT DOCUMENTS

| | | | |
|---|---|---|---|
| 1,890,697 | 12/1932 | Scanlan | 426/559 |
| 2,705,679 | 4/1955 | Griffiths et al. | 426/559 X |
| 3,297,449 | 1/1967 | Baker et al. | 426/551 |
| 3,384,495 | 5/1968 | Potter et al. | 426/637 |
| 3,752,675 | 8/1973 | Tsen et al. | 426/555 X |
| 3,997,684 | 12/1976 | Willard | 426/637 X |
| 4,107,345 | 8/1978 | MacDonald et al. | 426/637 |
| 4,348,417 | 9/1982 | Greup et al. | 426/808 X |
| 4,409,250 | 10/1983 | Van Hulle et al. | 426/559 X |

FOREIGN PATENT DOCUMENTS

| | | | |
|---|---|---|---|
| 2743230 | 4/1979 | Fed. Rep. of Germany | 426/637 |
| 53-5387 | 2/1978 | Japan | 426/550 |

OTHER PUBLICATIONS

Potter et al., "New Potato Snack Item", *Bakers Weekly*, vol. 197, No. 8, 2–1963, pp. 42 & 43, 426–637.

*Primary Examiner*—Arthur L. Corbin
*Attorney, Agent, or Firm*—Richard L. Johnston

[57] ABSTRACT

A snack food is prepared from an extrudable mixture, containing dehydrated potato, baking powder, mono- and diglycerides of fatty acids and water, which is extruded as a flat sheet through a sheeting die with a narrow opening, cut into pieces of predetermined size and shape and baked, the composition of the dehydrated potato, the proportion of the baking powder, the size of the opening in the sheeting die, the cutting of the sheet and the temperature and time of baking being controlled to produce a shaped, hollow potato snack in which the sides are entirely enclosed, with the top and bottom being formed from the top and bottom of said cut sheet, and a cross section of said top and bottom being approximately one-half of the thickness of said cut sheet.

8 Claims, 6 Drawing Figures

POTATO SNACKS AND METHOD OF PREPARATION

RELATED CASE

This application is a continuation-in-part of U.S. patent application Ser. No. 376,421 filed May 10, 1982, now abandoned.

BACKGROUND

The preparation of snack foods from potato such as, for example, potato chips, or French fried potatoes, is well known in the art. Various dried potato products are also well known in the art and can be prepared for use in making mashed potatoes and similar foods by mixing them with water. Some dried potato products contain added ingredients such as sodium bisulfite and BHA to preserve color and freshness and also minor amounts of mono- and diglycerides of fatty acids to improve texture. These mono- and diglycerides of fatty acids normally contain the monoglycerides as the principal component and the diglycerides as a minor component, usually less than 10%, as well as a small amount of triglycerides, usually less than 5%. The amounts of these mixtures of mono- and diglycerides of fatty acids sometimes added to dried potato products is very small, usually ranging from 0.5 to 1.50% by weight of the potato.

In raw potatoes the starch granules are ungelatinized. In dehydrated or dried potato products the starch granules are burst and, therefore, are described as "gelatinized".

Heretofore, as described by Potter et al, Bakers Weekly, Feb. 25, 1963, pages 42 and 43, potato snacks have been made on a laboratory scale from the following ingredients:

200 parts by weight of potatoes, steamed 30 minutes
100 parts of potato starch
20 parts of potato flour
5 parts of salt
1 part of karaya gum
19 parts of shortening The steamed potatoes are mashed in a mechanical mixer for five minutes. The starch, flour, salt and gum are added and mixing is continued for another minute. Shortening is then added and the mixing is continued an additional five minutes. The resulting dough is rolled to 1/16-inch thickness, cut to the desired size and shape, and dried in a forced air dryer at 300° F. for approximately 25 minutes.

From the foregoing description, one skilled in the art would recognize that steaming the raw potatoes would cause gelatinization and it would be assumed that the potato starch and potato flour contained the starch in ungelatinized form. The term "shortening" as used in the art normally refers to triglycerides of fatty acids. Hence, in this composition the amount of shortening by weight of the total starch including the gelatinized and ungelatinized starch would be approximately 6% by weight.

Using the same composition, snack foods in the shape of a scoop have been described in U.S. Pat. No. 3,384,495.

The foregoing products are said to be puffed in various shapes.

U.S. Pat. No. 4,348,417, which alludes to British Pat. No. 1,261,730, describes a product which is referred to as potato crisps made from a mixture of potato flour and potato starch, formed into a dough compressed into flakes and the flakes heated in steam. According to U.S. Pat. No. 4,348,417 a variation of this product is obtained by mixing a composition consisting essentially of starch-containing component, selected from the group consisting of potato flour and potato starch, corn, buckwheat, tapioca, rice flour and soya meals and mixtures thereof, with 5-20% by weight of an active yeast, based on the starch containing component, water and 0.5-5% by weight of sugar, fermentable by yeast, based on the starch containing component and/or 20-100 ppm of enzyme capable of forming such a sugar to form a dough mass, fermenting the dough mass for a period of time and at a temperature sufficient to form a light structure and frying the fermented dough to obtain a crispy snack of light structure.

Japanese Patent Publication 53-5387 describes the manufacture of crackers by mixing, in steam, 100 parts by weight flour, (presumably wheat flour), 50-150 parts by weight dried potato powder, baking bowder, seasoning and water, molding, drying and baking, or frying the product in oil.

According to German Patent Publication No. 27 43 230, published Apr. 5, 1979, a potato crisp product is made of raw potatoes which are cut into small chips, squares or spheres and are blanched at 60°-80° C. in water for a few minutes. Drying in hot air converts these chips into a thin crisp outer shell with a large void inside. The final crisps are coated with flavors and aromas.

According to U.S. Pat. No. 2,705,679, ready-to-eat food products are prepared by feeding diced raw potatoes into the base of a stream of air heated to a temperature from about 120°-160° C., the velocity of the stream being such that the diced raw potatoes are tumbled about and suspended by the air stream whereby they are uniformly expanded into hollow shells by the rapid evaporation of moisture and are further cooked and at least partially dried by the action of the air stream. According to the preferred procedure. the diced potatoes are blanched in boiling water for about one minute before feeding them into the air stream.

U.S. Pat. No. 1,890,697 describes a process of manufacturing food units of hollow globular form by forming a dough of a plurality of cereal flours embodying a puffing starch, dividing the uncooked dough into pellets, cooking the pellets, heating the pellets by drying, steam rolling the pellets while hot to form them into thin flakes, baking the flakes at a moderate temperature to puff or expand them into globular form, then subjecting the resultant puffed unit to a higher temperature to toast them. The preferred cereal flour is wheat flour and the preferred puffing starch is rice flour.

An object of this invention is to provide a new and improved type of puffed snack in which the major essential component is derived from dehydrated potato containing a small amount of mono- and/or diglycerides of fatty acids, with or without the addition of a small amount of hydroxylated lecithin, a small amount of seasoning, and a minor proportion of degermed corn flour, the dehydrated potato having the starch in a gelatinized form and the corn flour, if used, initially having the starch in ungelatinized form.

BRIEF SUMMARY OF THE INVENTION

The present invention is based on the discovery that a certain type of dehydrated potato containing minor amounts (usually 0.075-1.0% by weight) of mono- and diglycerides of fatty acids, with or without up to 5% triglycerides of fatty acids, when mixed with a leavening agent such as baking powder (a minor amount, usually 1-2% by weight of the solids), and optionally with seasoning or coloring agents which do not destroy puffing, such as caramel (burnt sugar), and water in sufficient amount to make an extrudable dough mix, thereafter extruded as a flat sheet using a sheeting die with a narrow opening, cut into pieces of predetermined size and shape and baked, with the composition of the dehydrated potato, the proportion of the leavening agent, the size of the opening in the sheeting die, the cutting of the sheet and the temperature and time of baking being controlled, produces a shaped, hollow potato snack in which the sides are entirely enclosed with the top and bottom being formed from the top and bottom of said cut sheet and a cross section throughout being approximately one-half of the thickness of said cut sheet.

DETAILED DESCRIPTION OF THE INVENTION

The best mode contemplated for the practice of the invention involves the use of a product known commercially as "Potato Buds", produced by General Mills, Inc., which comprises dried potato with color and freshness preserved by sodium bisulfite and BHA and glycerides of fatty acids added in minor amounts to improve texture. This particular type of dehydrated potato, which apparently contains minor amounts of glycerides of fatty acids of the type normally available in the food industry such as mono-, di- and tristearyl glycerides, usually in proportions of 90%, 8% and 2% by weight, respectively, is well known.

In practicing the invention the dried commercially available "Potato Buds" are mixed with a leavening agent, such as baking powder, and optionally with flavoring agents, such as salt, or coloring agents, such as caramel coloring, and ground together. To this mixture is then added a sufficient amount of water to form an extrudable dough mixture and the extrudable dough mixture is extruded through a sheeting die to form a flat sheet. The opening in the sheeting die is preferably quite narrow and excellent results have been obtained by using a sheeting die having an opening of approximately 0.032 inch. The sheet is then cut into predetermined sizes and shapes with a knife or other cutting or shaping tool to form pieces which are then heated in an oven at a temperature sufficiently high to cause the leavening agent to expand the central portion without blowing out the ends.

Figure 1:
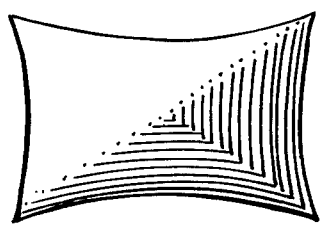
Figure 2:
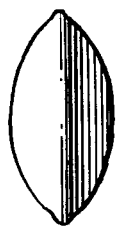
Figure 3:
Figure 4:
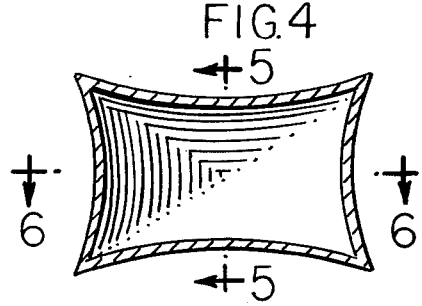
Figure 5:
Figure 6:
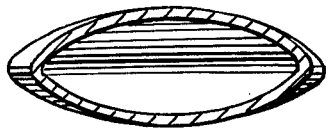

By cutting pieces one inch by one-half inch and baking them, hollow, pillow-shaped snacks are produced as shown in the attached drawing in which:

FIG. 1 is a top plan view;
FIG. 2 is an end view;
FIG. 3 is a side view;
FIG. 4 is a cross sectional view taken along the lines 4,4 of FIG. 3;
FIG. 5 is a cross sectional view taken along the lines 5,5 of FIG 4, and
FIG. 6 is a cross sectional view taken along the lines 6,6 of FIG. 4.

The previously described product is generally pillow-shaped. However, other configurations which are hollow and have paper thin sides can be produced by altering the shape of the flat piece from which they are made. Thus, by using a blank which is round, a circular product is obtained. By using cutters in the form of animal shapes, products having the shapes of animals which are hollow wth sides of paper thin thickness can be produced.

The reason why it is possible to produce products of the type described in which a hollow space is completely enclosed by paper thin sides is not clearly understood and it should be pointed out that it is believed the presence of minor amounts of mono- and diglycerides of fatty acids in the dehydrated potato is a primary factory in bringing about puffing and in providing proper extrudability and expandability in the formation of the sheet and in the subsequent baking of the pieces. Attempts to use ordinary potato flour and potato granules were not successful. Attempts to carry out a similar process with other types of starchy polysaccharides, either alone or in conjunction with the above identified dehydrated potato, were unsuccessful with one exception as hereafter described.

The invention is further illustrated but not limited by the following examples in which the quantities are by weight unless otherwise indicated.

|  | EXAMPLE I DARK | | EXAMPLE II LIGHT | |
|---|---|---|---|---|
|  | BATCH g. | % By Wt. | BATCH g. | % By Wt. |
| POTATO BUDS* | 1100 | 95.99 | 1100 | 96.50 |
| SALT | 20 | 1.75 | 20 | 1.75 |
| BAKING POWDER | 20 | 1.75 | 20 | 1.75 |
| CARAMEL COLOR | 6 | 0.51 | | |
|  | 1146 | 100.00% | 1140 | 100.00% |
| WATER ADDED | 850-900 | 74.1-78.50% of solids | 900 | 79.00 |

*General Mill's Potato Buds: Ingredients - dried potato (with color and freshness preserved by sodium bisulfite and BHA) mono- and diglycerides of fatty acids as previously described (.075 to 1.0% by weight).

The procedure in Example I was to grind in a laboratory hammermill through a 024 RP (round perforated) screen the salt, baking powder and caramel color. The Potato Buds were crushed in a mill. The crushed "Buds" were blended well with the salt, baking powder and caramel color mix and ground in a laboratory hammermill with a 050 SS (straight slot) screen.

To 1146 grams of this mix 900 ml of water was added to form an extrudable mixture which was then extruded in a macaroni press using a sheeting die with an opening of approximately 1/32". The sheet from the press was cut in 1"×½" pieces and the pieces were baked on wire screen trays in a baking oven at 400° F. for five to six minutes. They were removed when browning started. This resulted in a brownish color, pillow-shaped product as shown in FIGS. 1-3 of the drawing with paper thin sides having a thickness of around 0.1 to 1 mm, as shown in cross section in FIGS. 4, 5 and 6 of the drawing.

The procedure in Example II was the same except that the caramel color was omitted and the resultant product was light in color.

The pillow-shaped pieces with thin wall sections have a crisp texture and the characteristic potato flavor. In the drawing the pieces are shown approximately twice the normal size.

EXAMPLE III

The basic formula used in Example II was followed except that instead of using potato buds alone the potato buds were mixed with 10–40% by weight of each of the following ingredients:

Soft wheat flour (cake flour)
Rice flour
Hard wheat bakers flour
Pregelatinized wheat starch (Pagel 90)
Pregelatinized corn flour
Degermed corn flour
Defatted soy flour In other respects the same procedure was followed as in Examples I and II. Of all of the above ingredients acting as a partial replacement for the dehydrated potato, the degermed corn flour was the only one which permitted puffing. The resultant product made with the dehydrated potato and 10–40% by weight degermed corn flour, based on the total weight of dehydrated potato and degermed corn flour, together with the small amount of sodium chloride and baking powder as specified in Examples I and II gave a product which was crisp or brittle and, on being chewed, softened very quickly. Without the addition of the degermed corn flour, the product was harder and did not readily disintegrate in the mouth as quickly as the combination of the dehydrated potato and degermed corn flour. The degermed corn flour is a form of ungelatinized corn starch made by processing corn so as to remove the germ portion after the bran has been removed leaving the ungelatinized starch, together with some proteins and minerals.

It will be recognized that the amount of puffing is an important factor in the manufacture of the product. The process is not practical unless the amount of puffing is at least of the order of 99% of the dough pieces which are subjected to baking.

In general, the addition of shortening (triglycerides of fatty acids) in amounts more than 5% by weight of the dehydrated potato makes the process impractical because of reduction in the amount of puffing. This is also true of flavoring ingredients which contain some fat such as, for example, cheese powder, bacon granules and barbecue seasoning. The cheese seasoning and the barbecue seasoning gave very poor puffing and no puffing, respectively. The addition of a food fiber derived from wood (Solkafloc) at a level of 15% by weight replacement of the dehydrated potato gave a product with no puffing whatsoever.

The addition of a small amount of hydroxylated lecithin in the range of 0.1–2% by weight, preferably 0.5% by weight of the dehydrated potato, contributes to the reduction of stickiness of the dough during extruding and is an important functional improvement, although there is little effect on the texture of the finished product.

Seasonings applied to the surface of the pieces to be baked such as artificial cheese flavor, refined corn oil (Mazola) and a pan-greasing agent (Pam) all served to destroy any puffing characteristics in the finished product.

The leavening agent should be a chemical leavening agent, such as baking powder. The invention is not limited to the use of any particular brand of baking powder so long as it generates carbon dioxide gas on baking. The baking powder used in the examples was a mixture of sodium bicarbonate and an acid phosphate. This is a common type of baking powder containing sodium bicarbonate plus an acidic component that reacts with the sodium bicarbonate to produce carbon dioxide gas. Most baking powders of this type comprise a mixture of sodium bicarbonate and an acid phosphate, such as calcium acid phosphate or an acidic polyphosphate. Some baking powders contain more than one acidic ingredient, for example, sodium aluminum sulfate and monocalcium phosphate. Since the amount of baking powder used is quite small any residue from the baking powder, which in most cases would be a sodium phosphate, is also quite small and inconsequential in the structure of the final product.

The chemical leavening agent, namely, baking powder, is essential for the purpose of the invention. Other leavening agents such as yeasts which are used in making bread and crackers are unsuitable to make the type of product contemplated by the invention and impractical from the standpoint of manufacture.

From the foregoing it will be clear that the final product consists essentially of dehydrated potato. The residue from the baking powder is practically insignificant. The shaped potato snacks prepared as described in the examples do not require additional salt to either the dough or finished pieces although salt can be added for flavor variations. The amount of hydroxylated lecithin, if used, is also of no practical significance in the final shaped potato snacks which usually contain at least approximately 96% potato solids and 3–5% moisture and can be stored for indefinite periods under suitable packing. In the preferred method of manufacture, as described in the examples, no fat or oil is used in the precursor mixture or for manufacture, and the product is baked so that the final product is essentially fat free.

Experiments with different sized dies in making the extruded dough pieces prior to baking show that sheet thickness has some influence on puffing ability. In tests made with three dies, the first having an extrusion opening of 0.020", the second having an extrusion opening of 0.032" and the third having an extrusion opening of 0.042", the medium thickness die provided the best puffing followed by the thinner die, and last the thicker die. Puffing was virtually non-existent for the first and third dies using compositions of the type described in Examples I and II.

As previously indicated, attempts to manufacture the puffed snack using a dehydrated potato which did not contain mono- and/or diglycerides were unsuccessful. Attempts to use wheat flour, rice flour, hard wheat bakers flour, pregelatinized wheat starch, pregelatinized corn flour, and defatted soy flour in combination with the dehydrated potato containing the mono- and diglycerides of fatty acids were also unsuccessful.

The minor amounts of mono- and diglycerides of fatty acids which are present in the dehydrated potato employed as a starting material are usually within the range of 0.05 to 1.50% by weight of the potato. The essential components of the dry mix before addition of the water to form a dough are the dehydrated potato containing a minor amount of glycerides of fatty acids and the baking powder whch is also present in a minor amount sufficient to cause the top and bottom portions of a flat sheet of the extrudable mix to expand from top to bottom without blowing out the sides when heated in a baking oven. The amount of baking powder is naturally subject to some variation but good results have been obtained with proportions corresponding to 1–2% by weight of the dry mix prior to the addition of water to form an extrudable dough.

While the concept has been demonstrated as a pillow-shape produced from a cut ribbon, virtually any shaped product can be produced from the sheeted dough by cutting or forming the shape with cookie cutters or extrusion dies. This permits novel animal shapes or alphabet forms with dimensional appeal to younger consumers.

The use of a dough mix prepared as previously described permits uniform puffing to develop during baking, and the resultant products differ from previously puffed products that depend upon the use of hot oil or instant heat to create the puffed expansion. Since the system does not depend on hot oil, no fat pick-up occurs offering a caloric advantage for the shaped snack products over conventional fried snacks.

Minor variations in flavor can be created by the use of seasonings or spray applications of flavorings so long as puffing is not affected.

Bagged as snacks the shaped potato pieces offer an alternative to potato chips and French fried potatoes with reduced sodium and caloric appeal. The products can also be used as croutons in soups or salads. With coloring as described in Example I the snacks take on an appearance of potato skin, without coloring as described in Example II the snacks have a potato chip color. Naturally the appearance can be varied considerably by the addition of various types of seasoning.

The invention is hereby claimed as follows:

1. A process of producing a shaped snack product which comprises preparing a finely divided solid mixture of baking powder and dehydrated potato, said dehydrated potato containing a minor proportion by weight of fatty acid glyceride consisting essentially of mono- and diglycerides of fatty acids, said mixture optionally including a minor amount of a seasoning agent which does not destroy puffing, adding sufficient water to form an extrudable dough mixture, forming said dough mixture into a flat sheet, cuttng pieces of predetermined size and shape from said sheet and baking said pieces, the composition of the dehydrated potato, the kind and proportion of the baking powder, the thickness of said pieces and the temperature and time of baking being controlled to produce a shaped, hollow potato product in which the sides are entirely enclosed, with the top and bottom being formed from the top and bottom of said cut pieces, and a cross section of said top and bottom being approximately one-half of the thickness of said cut pieces.

2. A process as claimed in claim 1 in which said finely divided solid mixture, prior to adding water to form an extrudable dough mixture, contains at least approximately 96% by weight dehydrated potato, said dehydrated potato containing 0.05 to 1.50% by weight of said mono- and diglycerides of fatty acids, said mixture also containing a minor proportion of baking powder within the range of about 1% to 2% by weight of said mixture, a minor proportion by weight of said mixture, of salt and optionally a minor proportion, by weight of said mixture, of caramel color.

3. A process as claimed in claim 1 in which approximately 10–40% by weight of said dehydrated potato is replaced by degermed corn flour.

4. A process as claimed in claim 1 in which the wall thickness of said pieces is approximately 0.032 inch.

5. A process as claimed in claim 1 in which the wall thickness of the resultant product is within the range of 0.1 to 1 millimeter.

6. A baked, shaped snack product having wall sections completely enclosing a hollow space, said product comprising dehydrated potato, containing a minor amount of fatty acid glyceride consisting essentially of mono- and diglycerides of fatty acids, a minor amount of baking powder residue resulting from the reaction of sodium bicarbonate with an acid phosphate, and optionally a minor amount of a seasoning agent which does not destroy puffing.

7. A baked, shaped snack product as claimed in claim 6 containing at least approximately 96% by weight of said dehydrated potato.

8. A baked, shaped snack product as claimed in claim 6 containing at least approximately 96% by weight of a mixture of said dehydrated potato and degermed corn flour, said degermed corn flour being present in said mixture in an amount of 10–40% by weight.

* * * * *